US012759138B1

(12) United States Patent
Bosscher et al.

(10) Patent No.: US 12,759,138 B1
(45) Date of Patent: Oct. 13, 2026

(54) ROBOTIC SYSTEM INCLUDING MOVABLE AIMING DEVICE MOUNT AND RELATED METHODS

(71) Applicant: Eagle Technology, LLC, Melbourne, FL (US)

(72) Inventors: Paul M. Bosscher, West Melbourne, FL (US); John R. Archer, West Melbourne, FL (US); Bradley R. Yemm, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 19/238,239

(22) Filed: Jun. 13, 2025

(51) Int. Cl.
*B25J 9/10* (2006.01)
*B25J 5/00* (2006.01)
*B25J 9/00* (2006.01)

(52) U.S. Cl.
CPC ............. *B25J 9/1015* (2013.01); *B25J 5/005* (2013.01); *B25J 9/0009* (2013.01); *B25J 9/0015* (2013.01); *B25J 9/1005* (2013.01)

(58) Field of Classification Search
CPC ........ B25J 5/005; B25J 9/0009; B25J 9/0015; B25J 9/1005; B25J 9/1015; B25J 9/10
See application file for complete search history.

(56) References Cited

U.S. PATENT DOCUMENTS 6,113,343 A * 9/2000 Goldenberg ........... B25J 19/005 239/587.2
9,448,036 B2 9/2016 Samuels et al.
2010/0068024 A1 3/2010 Agens
2012/0294696 A1* 11/2012 Summer ............. G05B 19/409 700/264
2025/0060350 A1* 2/2025 He ........................... G01N 1/24

FOREIGN PATENT DOCUMENTS

WO WO-2023154561 A1 * 8/2023 ............ B25J 19/023

OTHER PUBLICATIONS

Anulare, Louis; "PdM Unmanned Ground Vehicles;" NDIA Quarterly Industry PM Force Projection Portfolio Update; Jul. 13, 2017; Project Manager Force Projection; 14 pages.

* cited by examiner

*Primary Examiner* — Prasad V Gokhale
(74) *Attorney, Agent, or Firm* — ALLEN, DYER, DOPPELT, GILCHRIST, P.A. Attorneys at Law

(57) ABSTRACT

A robotic system may include a motorized chassis, and an articulating arm carried by the motorized chassis. The articulating arm may be configured to carry an aimable device for coarse aiming thereof. The robotic system may also include an aiming device mount carried by the articulating arm and configured to mount the aimable device, and an aiming arrangement configured to move the aiming device mount relative to the articulating arm for fine aiming of the aimable device. The robotic system may also include a controller configured to operate the articulating arm and the aiming arrangement for aiming the aimable device for coarse and fine aiming.

20 Claims, 4 Drawing Sheets

ROBOTIC SYSTEM INCLUDING MOVABLE AIMING DEVICE MOUNT AND RELATED METHODS

TECHNICAL FIELD

The present invention relates to the field of robotics, and, more particularly, to articulating arms, and related methods.

BACKGROUND

A robot may be useful for assisting a human in performing one or more operations that would typically be performed by the human. In many instances, the robot may allow operations in locations where accessibility by a human may be difficult or undesirable, for example, those operations that may be considered high risk or dangerous to a human (e.g., stand-off operations).

One type of robot is a tracked robot. A tracked robot includes tracks rather than wheels defining a robot chassis. A tracked robot may traverse rough, uneven, and loose terrain, for example, as compared to other types of robots. A tracked robot may also traverse larger obstacles as compared to other types of robots.

Using an articulating arm coupled to the motorized chassis, the robot may perform any number of functions. For example, a robot may be used for reconnaissance or data collecting, for example, collecting images or video, from a camera mounted on the articulating arm. A robot may also be used for object manipulation using a gripper coupled to the articulating arm. A robot may also be used for stand-off firing of projectiles or lasers, or for other operations where more accurate aiming is desired, for example, from a disrupter or laser or other aimable tool mounted to the articulating arm or chassis.

U.S. Patent Application Publication No. 2010/0068024 to Agens discloses a remote-controlled robot for handling hazardous material, such as explosive devices, that includes a support frame, an articulating arm having a proximal end coupled with the support frame and a distal end remote therefrom, and a gripper connected with the distal end of the articulating arm, the gripper having gripper fingers that oppose one another. The robot includes a transporting assembly, such as wheels or a track, coupled with the support frame for selectively moving the robot to a desired location. The robot includes a tool basket disposed adjacent the proximal end of the articulating arm. The tool basket includes a plurality of tool receiving slots adapted to receive tools, with different tools stored in each of the slots. By carrying a plurality of tools in a basket, the robot may stay downrange when changing tools, rather than requiring the robot to return up range for changing tools.

U.S. Pat. No. 9,448,036 to Samuels et al. discloses a sighting assembly for a projectile launching device that includes a housing enclosure defining an interior chamber having at least one aperture formed therein and a sight operably associated with the housing enclosure. The sighting assembly also includes a rangefinder disposed in the interior chamber in communication with the at least one aperture, wherein the rangefinder is operable to measure at least a distance to a target, and a switch electrically coupled to at least the rangefinder that causes the rangefinder to measure the distance to the target upon actuation, wherein the switch is accessible to a user. The sighting assembly also includes a true aim point compensation calculator disposed in the interior chamber that receives the measured distance from the rangefinder and calculates at least a vertical drop of a projectile associated with the projectile launching device over the measured distance. An aiming point indicator extends perpendicularly from a side surface towards an opposing side surface of the interior chamber of the housing enclosure, wherein the aiming point indicator is at least selectively vertically movable within the interior chamber of the closure and is operably coupled to a motor disposed in the interior chamber, and wherein the aiming point indicator is visible through the sight. The true aim point compensation calculator causes the motor to move the aiming point indicator from a line of sight aiming point to a true aiming point to compensate for at least the vertical drop of the projectile over the measure distance.

There may be a desire for additional robotic systems that are robust and provide precise aiming.

SUMMARY

A robotic system may include a motorized chassis, and an articulating arm carried by the motorized chassis. The articulating arm may be configured to carry an aimable device for coarse aiming thereof. The robotic system may also include an aiming device mount carried by the articulating arm and configured to mount the aimable device, and an aiming arrangement configured to move the aiming device mount relative to the articulating arm for fine aiming of the aimable device. The robotic system may also include a controller configured to operate the articulating arm and the aiming arrangement for aiming the aimable device for coarse and fine aiming.

The articulating arm may include a plurality of arm segments with respective movable joints between adjacent arm segments. The plurality of arm segments may include a hollow elongated housing containing the aiming arrangement, for example.

The hollow elongated housing may have an opening therein, and include a flexure coupling the aiming device mount to the hollow elongated housing within the opening. The hollow elongated housing may have opposing forward and rearward ends, and the flexure may be coupled to the hollow elongated housing adjacent the forward end, for example.

The aiming arrangement may include first and second movable bodies movable relative to the aiming device mount. The aiming arrangement may also include first and second motors coupled to the first and second movable bodies, for example.

The first and second movable bodies each may have a wedge shape. The aiming arrangement may further include a fixed body coupled to the aiming device mount and cooperating with the first and second movable bodies, for example. The robotic system may further include a gripper coupled to a distal end of the articulating arm, for example.

A method aspect is directed to a method of aiming an aimable device carried by an articulating arm of a robotic system. The method may include using a controller to operate the articulating arm for aiming the aimable device for coarse aiming. The method may also include using the controller to operate an aiming arrangement to move an aiming device mount relative to the articulating arm for fine aiming of the aimable device, the aiming device mount may be carried by the articulating arm.

Using the controller to operate the aiming arrangement may include using the controller to operate the aiming arrangement contained within a hollow elongated housing of one of a plurality of arm segments with respective movable joints between adjacent arm segments. The hollow elongated housing may have an opening therein, and a flexure may couple the aiming device mount to the hollow elongated housing within the opening.

The hollow elongated housing may have opposing forward and rearward ends, and the flexure may be coupled to the hollow elongated housing adjacent the forward end, for example. Using the controller to operate the aiming arrangement may include using the controller to operate first and second motors to move first and second movable bodies movable relative to the aiming device mount.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
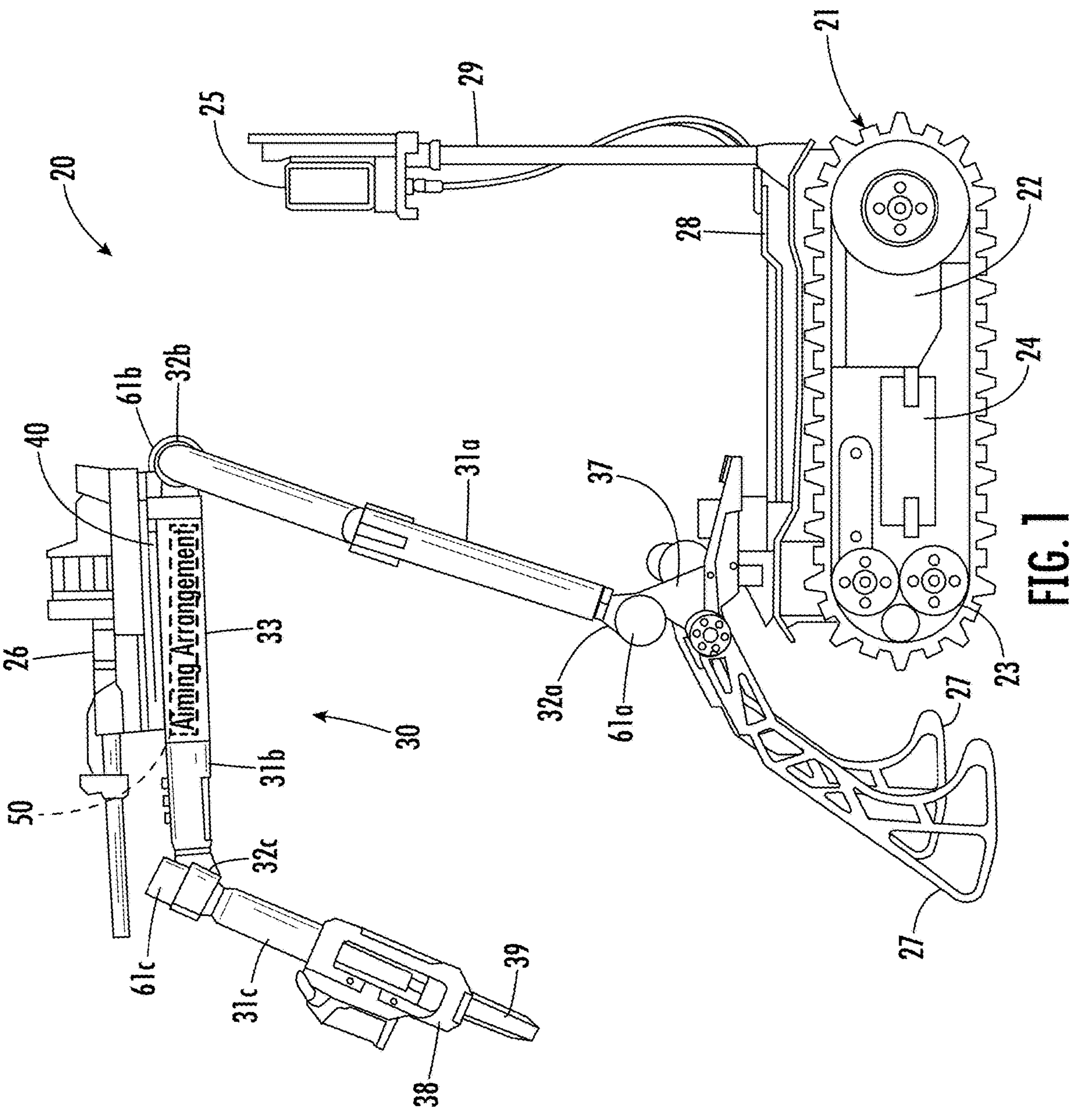
FIG. 1 is a side view of a robotic system in accordance with an embodiment.

Referring initially to FIG. 1, a robotic system 20 illustratively includes a motorized chassis 21 for operation over ground. The motorized chassis 21 may include a power source 24 coupled to a drive motor 22. The drive motor 22 is coupled to locomotion devices 23. The locomotion devices 23 are illustratively in the form of tracks (i.e., the robotic system 20 is a tracked robot system). Those skilled in the art will appreciate that the locomotion devices 23 may be or include wheels or other locomotion devices. Moreover, while a ground-based motorized chassis 21 is described herein, the motorized chassis may be an air-based or water-based motorized chassis. Additionally, more than one drive motor may be included within the motorized chassis 21. Still further, in some embodiments, the robotic system 20 may include a chassis that is not motorized, for example, installed on a fixed-base. Such a non-motorized chassis may be particularly advantageous for use in a factory, warehouse, and/or assembly line operation, as will be appreciated by those skilled in the art.

Leveling devices 27 may be coupled to the motorized chassis 21, for example, to maintain balance of the motorized chassis during operations and/or to right-side the motorized chassis, as will be appreciated by those skilled in the art. Circuitry 28, for example, wireless communications circuitry may be carried by the motorized chassis 21 and may cooperate with other circuitry described herein to communicate (e.g., receive and/or transmit) operational commands and status. A mast 29 may extend upwardly from the motorized chassis 21, for example, and carry a camera 25.

The robotic system 20 also includes an articulating arm 30 carried by the motorized chassis 21. More particularly, the articulating arm 30 has a proximal end 37 coupled to the motorized chassis 21 and a distal end 38. A gripper 39 may be coupled to the distal end 38 of the articulating arm 30. The gripper 39 may operate to pick up, move, poke, or place an object. Another device or devices, and/or additional devices may be coupled to the distal end 38 of the articulating arm 30, for example, based upon desired operations for the robotic system 20.

The articulating arm 30 carries an aimable device 26 for coarse aiming thereof. The aimable device 26 may be an optical device (camera), an incendiary device, explosive device, firearm device, and/or other mechanical device, for example. In some embodiments, the aimable device 26 may produce recoil when operated. The articulating arm 30 includes arm segments 31*a*-31*c*. The arm segments 31*a*-31*c* have respective movable joints 32*a*-32*c* between adjacent arm segments. The movable joints 32*a*-32*c* may be ball-and-socket joints, for example. The movable joints 32*a*-32*c* may include other and/or additional types of joints. Other and/or additional devices may be carried by the articulating arm 30 or by any one of the arm segments 31*a*-31*c*.

Joint motors 61*a*-61*c* are associated with each joint 32*a*-32*c*. As will be appreciated by those skilled in the art, the joint motors 61*a*-61*c* may define a shoulder motor, an elbow motor, and a wrist motor, respectively, for moving respective arm segments 31*a*-31*c*.

Figure 2:
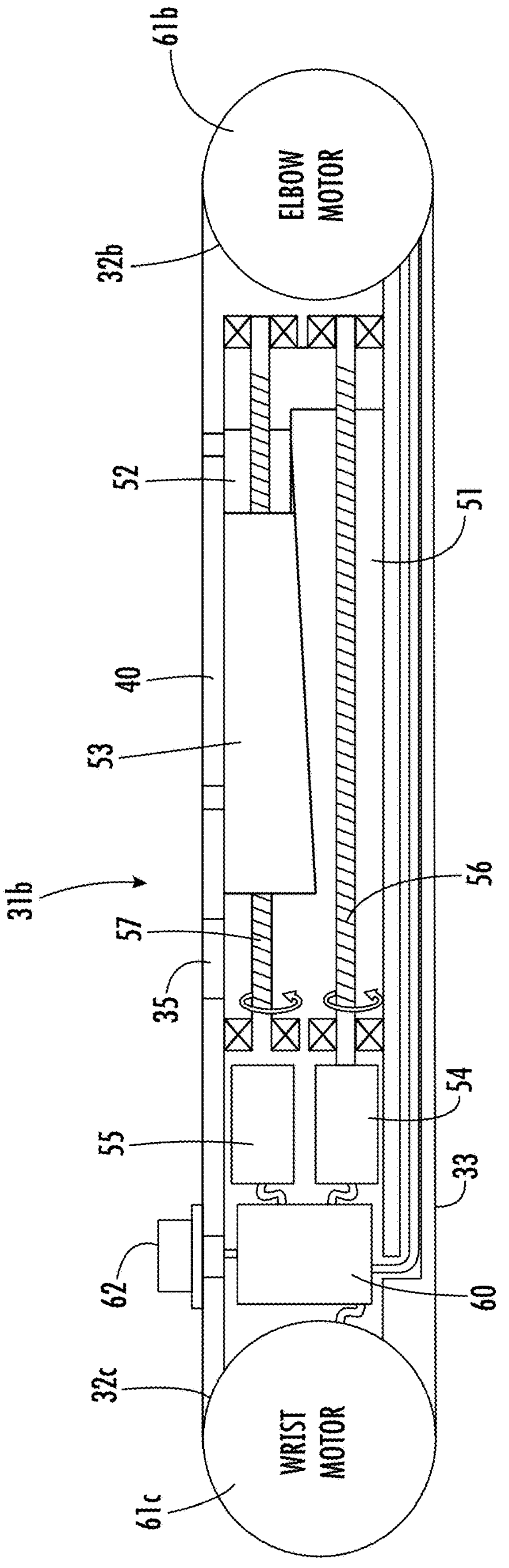
FIG. 2 is a side cut-away view of a portion of the articulating arm from the robotic system of FIG. 1.
Figure 3:
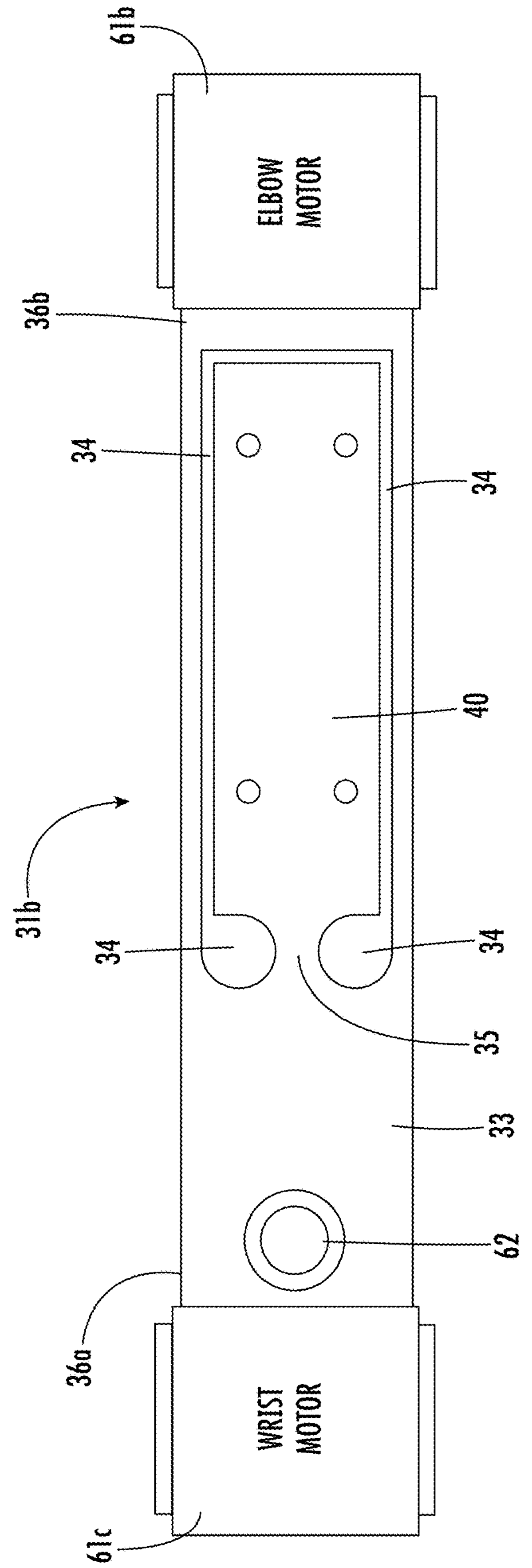
FIG. 3 is a top view of the portion of the articulating arm of FIG. 2.
Figure 4:
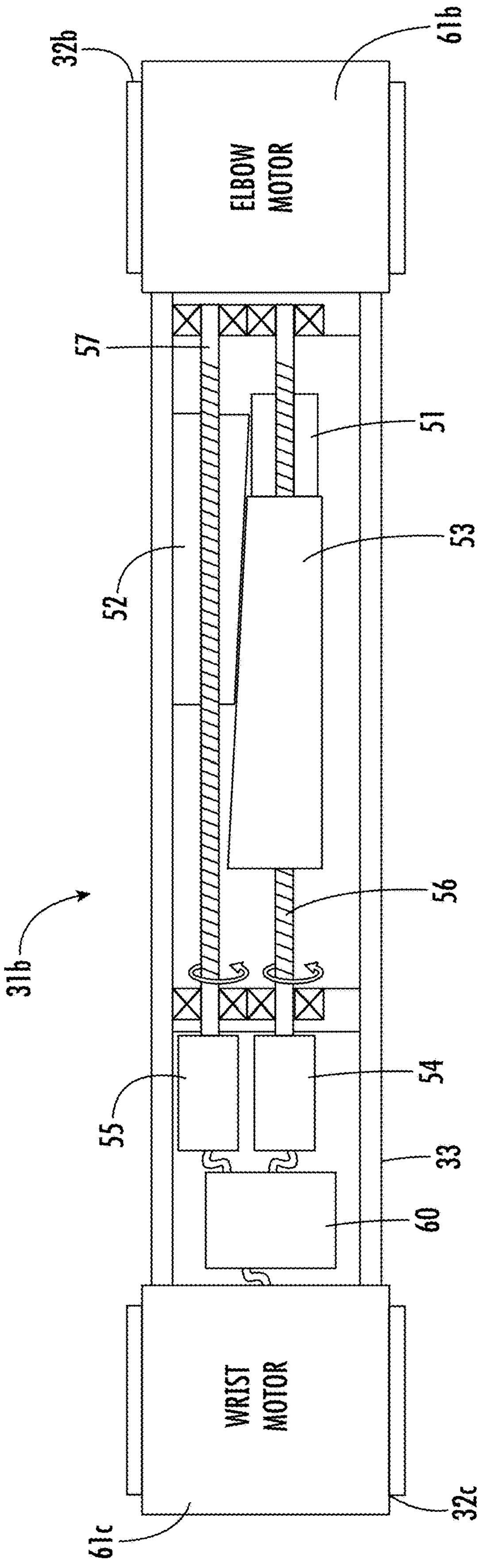
FIG. 4 is a top cut-away view of the portion of the articulating arm of FIG. 2.

Referring now additionally to FIGS. 2-4, one of the arm segments 31*b* includes or is in the form of hollow (e.g. tubular) elongated housing 33. The hollow elongated housing 33 has an opening therein 34. The opening 34 illustratively has a generally rectangular shape. The hollow elongated housing 33 has forward and rearward ends 36*a*, 36*b*.

The robotic system 20 also includes an aiming device mount 40 carried by the articulating arm 30 and configured to mount the aimable device 26. More particularly, a flexure 35 couples the aiming device mount 40 to the hollow elongated housing 33 within the opening 34 adjacent the forward end 36*a*. The flexure 35 illustratively has an hourglass shape. The flexure 35 may have a different shape in other embodiments.

The robotic system 20 also includes an aiming arrangement 50 that moves the aiming device mount 40 relative to the articulating arm for fine aiming of the aimable device 26. The aiming arrangement 50 includes first and second movable bodies 51, 52 that are movable relative to the aiming device mount 40 and illustratively contained within hollow elongated housing 33. The first and second movable bodies 51, 52 each illustratively has a wedge shape. A fixed body 53 is, for example, fixedly coupled to the aiming device mount 40 within the hollow elongated housing 33. The fixed body 53 illustratively has a wedge shape.

The fixed body 53 cooperates with the first and second movable bodies 51, 52, and more particularly, engages the first and second movable bodies as they move along a path of travel between the forward and rearward ends 36*a*, 36*b* of the hollow elongated housing 33. As the first and second movable bodies 51, 52 are moved between the forward and rearward ends 36*a*, 36*b*, the engagement of the sloped surfaces or wedge shapes causes the fixed body 53 to move the aiming device mount 40 in two-dimensions, namely pitch and yaw.

First and second respective motors 54, 55 are coupled to the first and second bodies 51, 52. More particularly, the first and second motors 54, 55 operate (e.g., rotate) first and second threaded shafts 56, 57, which carry the first and second movable bodies 51, 52. The first and second shafts 56, 57 are aligned longitudinally or along the length of the hollow elongated housing 33 (e.g., aligned with the axis connecting the movable joints 32*a*-32*c*). The first and second motors 54, 55 together with the first and second threaded shafts 56, 57 define a ball screw-drive arrangement, as will be appreciated by those skilled in the art.

A controller 60 operates the articulating arm 30 and the aiming arrangement 50 for aiming the aimable device 26 for coarse and fine aiming. The controller 60 may be carried by or within the hollow elongated housing 33. More particularly, the controller 60 includes circuitry that selectively operates the first and second motors 54, 55 to move the aiming device mount 40 as described above to provide coarse aiming of the aimable device 26. The controller 60 may also move the joint motors 61*a*-61*c* to move, for example, individually, each arm segment 31*a*-31*c* to provide coarse aiming of the aimable device 26 (e.g., within) 1°. In other words, the movement of the aiming device mount 40 is independent from the movement of the articulating arm 30.

The controller 60 may be carried, in some embodiments, by the motorized chassis 21 and/or may include the wireless communications circuitry 28 described herein. Operational instructions may be received by the controller 60, for example, via the wireless communications circuitry 28. In some embodiments, the controller 60 may be programmed with the desired instructions prior to deployment. In other embodiments, the controller 60 may operate one or more artificial intelligence (AI) algorithms to carry out the desired instructions and based upon sensed data, for example, based upon devices carried by the articulating arm 30 (e.g., a camera).

A connector 62, for example, an electrical connector, may be carried by hollow elongated housing 33 and may provide an electrical interface from inside the hollow elongated housing (e.g., coupling the controller 60) to outside the hollow elongated housing. As will be appreciated by those skilled in the art, the aiming device mount 40, the aiming arrangement 50, and the controller 60 may collectively define an aiming system, for example that may be added to or used with different robotic devices or with robotic systems.

The robotic system 20 may be particularly advantageous for providing a relatively compact and relatively precise aiming articulating arm 30. Additionally, with respect to aiming, the aiming device mount 40 and aiming arrangement 50 may be relatively compact in size and lightweight, and provide pan/tilt (i.e., pitch, yaw) with a relatively high precision (e.g., ±0.001°). Additionally, the aiming device mount 40 and aiming arrangement 50 together may carry upward of a 25 lbs. payload and may withstand 400+ lbs. of recoil forces, for example, when the aimable device 26 is in the form of an explosive or projectile-launching device. Moreover, the aiming device mount 40 and the aiming arrangement 50 may be implemented as an "add-on" into, for example, an "as-is" arm segment 31*a*-31*c*.

A method aspect is directed to a method of aiming an aimable device 26 carried by an articulating arm 30 of a robotic system 20. The robotic system 20 includes a motorized chassis 21 carrying the articulating arm 30, and the articulating arm is configured to carry the aimable device 26 for coarse aiming thereof. The method includes using a controller 60 to operate the articulating arm 30 for aiming the aimable device 26 for coarse aiming. The method also includes using the controller 60 to operate an aiming arrangement 50 to move an aiming device mount 40 relative to the articulating arm 30 for fine aiming of the aimable device 26, the aiming device mount carried by the articulating arm and mounting the aimable device.

Using the controller 60 to operate the aiming arrangement 50 includes using the controller to operate the aiming arrangement contained within a hollow elongated housing 33 of one of a plurality of arm segments 31*a*-31*c* with respective movable joints 32*a*-32*c* between adjacent arm segments. The hollow elongated housing 33 has an opening therein 34, and a flexure 35 couples the aiming device mount 40 to the hollow elongated housing within the opening.

The hollow elongated housing 33 has opposing forward and rearward ends 36*a*, 36*b*, and the flexure 35 may be coupled to the hollow elongated housing adjacent the forward end, for example. Using the controller 60 to operate the aiming arrangement 50 includes using the controller to operate first and second motors 54, 55 to move first and second movable bodies 51, 52 movable relative to the aiming device mount 40.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A robotic system comprising:

a motorized chassis;

an articulating arm carried by the motorized chassis and configured to carry an aimable device for coarse aiming thereof;

an aiming device mount carried by the articulating arm and configured to mount the aimable device;

an aiming arrangement configured to move the aiming device mount relative to the articulating arm for fine aiming of the aimable device; and a controller configured to operate the articulating arm and the aiming arrangement for aiming the aimable device for coarse and fine aiming.

2. The robotic system of claim 1 wherein the articulating arm comprises a plurality of arm segments with respective movable joints between adjacent arm segments.

3. The robotic system of claim 2 wherein one of the plurality of arm segments comprises a hollow elongated housing containing the aiming arrangement.

4. The robotic system of claim 3 wherein the hollow elongated housing has an opening therein; and comprising a flexure coupling the aiming device mount to the hollow elongated housing within the opening.

5. The robotic system of claim 4 wherein the hollow elongated housing has opposing forward and rearward ends; and wherein the flexure is coupled to the hollow elongated housing adjacent the forward end.

6. The robotic system of claim 1 wherein the aiming arrangement comprises:

first and second movable bodies movable relative to the aiming device mount; and first and second motors coupled to the first and second movable bodies.

7. The robotic system of claim 6 wherein the first and second movable bodies each has a wedge shape.

8. The robotic system of claim 6 wherein the aiming arrangement further comprises a fixed body coupled to the aiming device mount and cooperating with the first and second movable bodies.

9. The robotic system of claim 1 further comprising a gripper coupled to a distal end of the articulating arm.

10. An aiming system for a robotic system comprising a motorized chassis and an articulating arm to be carried by the motorized chassis, the articulating arm configured to carry an aimable device for coarse aiming thereof, the aiming system comprising:

an aiming device mount configured to be carried by the articulating arm to mount the aimable device;

an aiming arrangement configured to move the aiming device mount relative to the articulating arm for fine aiming of the aimable device; and a controller configured to operate the aiming arrangement for aiming the aimable device for fine aiming.

11. The aiming system of claim 10 wherein the aiming arrangement is contained within a hollow elongated housing of one of a plurality of arm segments with respective movable joints between adjacent arm segments.

12. The aiming system of claim 11 wherein the hollow elongated housing has an opening therein; and comprising a flexure coupling the aiming device mount to the hollow elongated housing within the opening.

13. The aiming system of claim 10 wherein the aiming arrangement comprises:

first and second movable bodies movable relative to the aiming device mount; and first and second motors coupled to the first and second movable bodies.

14. The aiming system of claim 13 wherein the first and second movable bodies each has a wedge shape.

15. The aiming system of claim 13 wherein the aiming arrangement further comprises a fixed body coupled to the aiming device mount and cooperating with the first and second movable bodies.

16. A method of aiming an aimable device carried by an articulating arm of a robotic system comprising a motorized chassis, the method comprising:

using a controller to operate the articulating arm for aiming the aimable device for coarse aiming, and operate an aiming arrangement to move an aiming device mount relative to the articulating arm for fine aiming of the aimable device, the aiming device mount carried by the articulating arm and mounting the aimable device.

17. The method of claim 16 wherein using the controller to operate the aiming arrangement comprises using the controller to operate the aiming arrangement contained within a hollow elongated housing of one of a plurality of arm segments of the articulating arm.

18. The method of claim 17 wherein the hollow elongated housing has an opening therein; and wherein a flexure couples the aiming device mount to the hollow elongated housing within the opening.

19. The method of claim 18 wherein the hollow elongated housing has opposing forward and rearward ends; and wherein the flexure is coupled to the hollow elongated housing adjacent the forward end.

20. The method of claim 16 wherein using the controller to operate the aiming arrangement comprises using the controller to operate first and second motors to move first and second movable bodies movable relative to the aiming device mount.

* * * * *